United States Patent [19]

Umetani et al.

[11] Patent Number: 5,436,764
[45] Date of Patent: Jul. 25, 1995

[54] DIE FOR FORMING A MICRO-OPTICAL ELEMENT, MANUFACTURING METHOD THEREFOR, MICRO-OPTICAL ELEMENT AND MANUFACTURING METHOD THEREFOR

[75] Inventors: Makoto Umetani, Izumi; Masaki Aoki, Minou, both of Japan

[73] Assignee: Matsushita Electric Industrial Co., Ltd., Osaka, Japan

[21] Appl. No.: 49,434

[22] Filed: Apr. 20, 1993

[30] Foreign Application Priority Data

Apr. 21, 1992 [JP] Japan ................. 4-100835

[51] Int. Cl.⁶ ..................... G02B 5/18; B29D 11/00
[52] U.S. Cl. ..................... 359/566; 264/2.5; 264/2.7; 264/1.21; 359/619; 359/742
[58] Field of Search ............. 359/566, 569, 742, 619, 359/565; 264/1.2, 1.3, 2.5, 2.7

[56] References Cited

U.S. PATENT DOCUMENTS

| | | | |
|---|---|---|---|
| 4,482,511 | 11/1984 | Komatsubara | 264/2.5 |
| 4,753,414 | 6/1988 | McCandless | 264/2.5 |
| 4,842,633 | 6/1989 | Kuribayashi et al. | |
| 5,013,494 | 5/1991 | Kubo et al. | 264/2.5 |
| 5,071,597 | 12/1991 | D'Amato et al. | 264/1.3 |
| 5,171,347 | 12/1992 | Monji et al. | 264/2.7 |

FOREIGN PATENT DOCUMENTS

| | | |
|---|---|---|
| 0404481 | 12/1990 | European Pat. Off. |
| 54-110857 | 8/1979 | Japan |
| 55-57807 | 4/1980 | Japan |
| 60-25761 | 6/1985 | Japan |
| 60-246230 | 12/1985 | Japan |
| 2-199402 | 8/1990 | Japan |
| 3-56901 | 3/1991 | Japan |
| 3-279901 | 12/1991 | Japan |

OTHER PUBLICATIONS

Patent Abstracts of Japan, vol. 15, No. 193, May 17, 1991.
Patent Abstracts of Japan, vol. 6, No. 113, Jun. 24, 1982.
Patent Abstracts of Japan, vol. 11, No. 346, Nov. 12, 1987.
Patent Abstracts of Japan, vol. 16, No. 102, Mar. 12, 1992.

*Primary Examiner*—Martin Lerner
*Attorney, Agent, or Firm*—Wenderoth, Lind & Ponack

[57] ABSTRACT

A die which can press-mold an accurate glass microoptical element such as a grating repetitively can be manufactured easily by adhering a thin film, having an inverse shape of the master of a micro-optical element, on the top flat plane of a hard base body and by forming a protective layer thereon. The die having an inverse shape of the master can press-mold glass repetitively. By press-molding glass with the die, a large number of reliable glass micro-optical elements of the same shape as the master can be produced at a low cost.

15 Claims, 5 Drawing Sheets

DIE FOR FORMING A MICRO-OPTICAL ELEMENT, MANUFACTURING METHOD THEREFOR, MICRO-OPTICAL ELEMENT AND MANUFACTURING METHOD THEREFOR

BACKGROUND OF THE INVENTION

1. Field of the Invention

The present invention relates to a glass micro-optical element such as a grating, a micro-Fresnel lens or a micro-lens array, a method for manufacturing a glass micro-optical element, a die used for forming a micro-optical element and a manufacturing method therefor.

2. Description of the Prior Art

In the prior art, when a grating is produced, a thermo-plastic resin is processed directly to form a grating (refer to Japanese Patent laid open Publication 54-110,857 and Japanese Patent Publication 60-25,761). However, such a resin grating has a disadvantage that the grating changes its volume or its shape with changes in environment such as temperature or humidity. Then, the accuracy of the grating is reduced. Further, because the strength of the resin is low, the surface is liable to be damaged. Thus, a very accurate and reliable grating cannot be produced with a thermo-plastic resin.

On the other hand, a glass grating has advantages that its durability is good, that it is not easily damaged on the surface, and that its accuracy is not deteriorated due to the environment. A method is proposed wherein a glass grating is formed directly on the glass surface by dry etching (Japanese Patent laid open Publication 55-57,807). However, it takes a long time to produce a grating using this method, and the mass production of the gratings of the same shape is impossible.

Recently, mass production by press-molding of glass was proposed for an optical glass element such as an asymmetrical glass lens. If a very accurate optical glass element is produced with the press-molding method, the shape of the optical glass element is required to be reproduced well. Therefore, a material of a die used for the press-molding is required to be inactive for glass at high temperatures, to be sufficiently hard at a surface portion in contact with glass on forming the glass, to be not easily damaged by friction and the like, to be hard to deform plasticly or hard to grow crystal grains at the surface portion at high temperatures, to be superior in heat shock resistance and to be superior on the workability for very accurate forming.

The materials for a die which satisfy these conditions to some extent include SiC and $Si_3N_4$ (refer to Japanese Patent laid open Publication 52-45,613). If SiC or $Si_3N_4$ is used as a die material, the problem exists that it is very difficult to form a die of a desired shape because the material is very hard. Further, the material is reactive with glass at high temperatures, and glass adheres to the die after repetitive forming with the press so that an accurate grating cannot be formed.

Further, a die has been recently proposed wherein a base material of a hard metal is coated with a platinum group alloy thin film (refer to Japanese Patent laid open Publication 60-246,230). The die can be used for grinding, but it cannot be used to produce a fine shape accurately. Thus, the die cannot be used as a die for a grating.

As to micro-optical elements other than gratings, a die for press-molding glass to form a reliable and accurate micro-optical element also has not yet been produced.

SUMMARY OF THE INVENTION

It is an object of the present invention to provide a method for easily manufacturing a die which can press-mold glass repetitively to produce a large amount of very accurate and reliable micro-optical elements.

It is another object of the present invention to provide a very durable and very accurate die which can press-mold glass micro-optical elements repetitively.

It is a still another object of the present invention to provide a very accurate micro-optical element.

It is a further object of the present invention to provide a method for manufacturing a glass micro-optical element.

In one aspect of the invention, the present invention provides a die for manufacturing a micro-optical element such as a grating. The die comprises a base body having a top flat plane. A heat resistant film is applied to the flat plane of the base body, the film having a surface of an inverse shape of a master of a micro-optical element. Further, a protection layer is formed on the surface of the film. The die is very hard, very durable, and it does not adhere to glass at high temperatures, so that glass can be press-molded repetitively. Glass can be formed repetitively by using the die, and a large amount of glass micro-optical elements can be manufactured at a low cost.

The die is manufactured as follows: first, a higher accurate master of the micro-optical element is provided. Then, a heat-resistant film is formed on the surface of the master, and the film is accurately separated from the master. Thus, the film duplicates an inverse shape of the fine shape of the master. Next, the film is adhered to a base body, and a protection layer is coated on the film. Because the transfer property for transfer of the shape of the master to the film is good, glass micro-optical elements having the same shape as the master can be manufactured with good reproducibility.

An advantage of the method for manufacturing a die for press-molding according to the present invention is that the inverse shape of the master is accurately reproduced directly so that the die has an accurate shape.

A further advantage of a method of the present invention is that mass production of micro-optical elements is possible at a low cost.

An advantage of the micro-optical element of the present invention is that it has an accurate shape.

Another advantage of the micro-optical element of the present invention is that because the micro-optical element is made of glass, it is superior in durability and its shape does not change with the environment.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Referring now to the appended drawings, a die for press-molding a grating is explained first.

Figure 1:
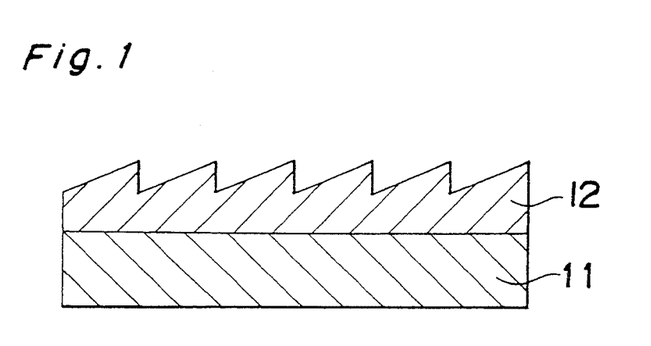
FIG. 1 is a schematic sectional view of a die for a grating, according to an embodiment of the present invention.
Figure 2:
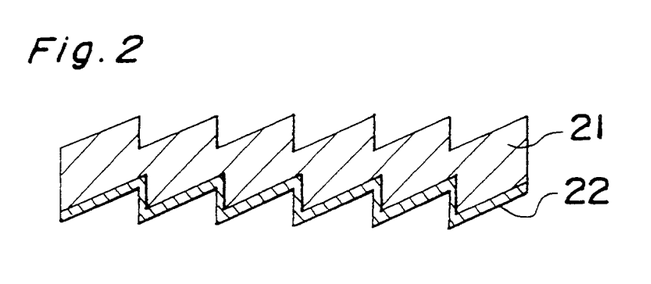
FIG. 2 is a schematic sectional view of a Ni-P alloy plate film for duplicating the inverse shape of the die for a grating, according to an embodiment of the present invention.

A grating master shown in FIG. 1 is produced as explained below. First, an aluminum (Al) thin film 12 is deposited on a flat glass substrate 11 and a saw-toothed grating shape of 2 $\mu$m pitch and 0.5 $\mu$m depth is formed accurately with a ruling engine. Next, after a releasing agent is coated on the surface of the grating master, a nickel (Ni) film 22 of about 0.1 $\mu$m thickness is deposited on the saw-toothed thin film 12, and further a thin film 21 of nickel-phosphor (Ni-P) alloy of 50 $\mu$m thickness is applied to the nickel film 22 with an electroplating process. A two-layer thin film 21, 22 thus produced is released from the grating master. Thus, the shape of the grating master is transferred inversely to the thin film 22. FIG. 2 shows a section of the thin films 21, 22 in this state.

Figure 3:
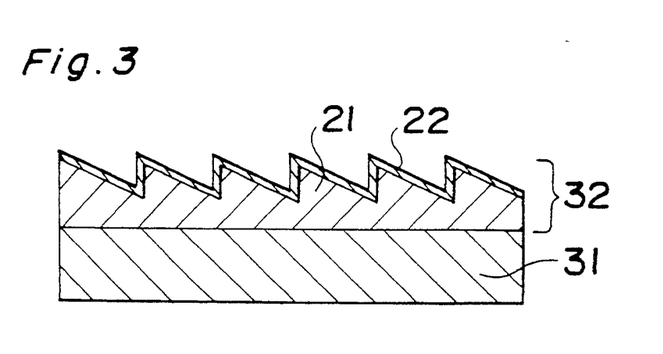
FIG. 3 is a schematic sectional view of a die in a state wherein a Ni-P alloy plating film, duplicating the inverse shape of the die for grating, is adhered to a surface of a base material polished as a specular plane at the top and bottom planes of a cermet cylinder including TiN as a main component.

Next, the rear surface of the Ni-P thin film 21 of the two-layers 21, 22 is ground to have a flat surface. On the other hand, a cermet cylinder 31 having TiN as a main component and having a 20 mm diameter and a 6 mm thickness is polished to have top and bottom flat planes and the top plane, is polished to have a specular flat surface. Then, the flat surface of the two-layer thin film 21, 22 (32) is adhered with an adhering agent to the specular flat surface of the cermet cylinder. FIG. 3 shows the die in this state.

Figure 4:
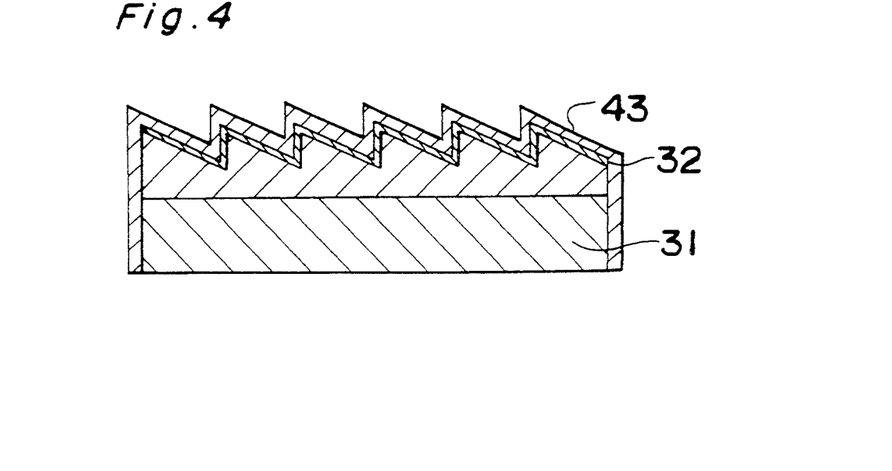
FIG. 4 is a schematic sectional view of a die for press-molding a grating, according to an embodiment of the present invention.

If glass is press-molded with the die shown in FIG. 3, the surface of the Ni-P thin film 22 is oxidized and a very accurate grating cannot be formed. Therefore, as shown in FIG. 4, a thin film 43 of platinum-ruthenium-tantalum (Pt-Ru-Ta) alloy of about 5 $\mu$m thickness is applied to the surface of the die by sputtering and acts as a protective layer. Thus, a die for press-molding a very accurate glass grating is completed.

That is, the die comprises the cermet base body 31, the layer 32 having an inverse shape of the grating master adhered to the base body 31, and the Pt-Ru-Ta alloy protective layer 43 applied to the layer 32. Because the die for press-molding explained above is an accurate replica of an inverse shape of the grating master shown in FIG. 1, very accurate glass gratings having the same shape of the grating master can be molded with the die.

Figure 5:
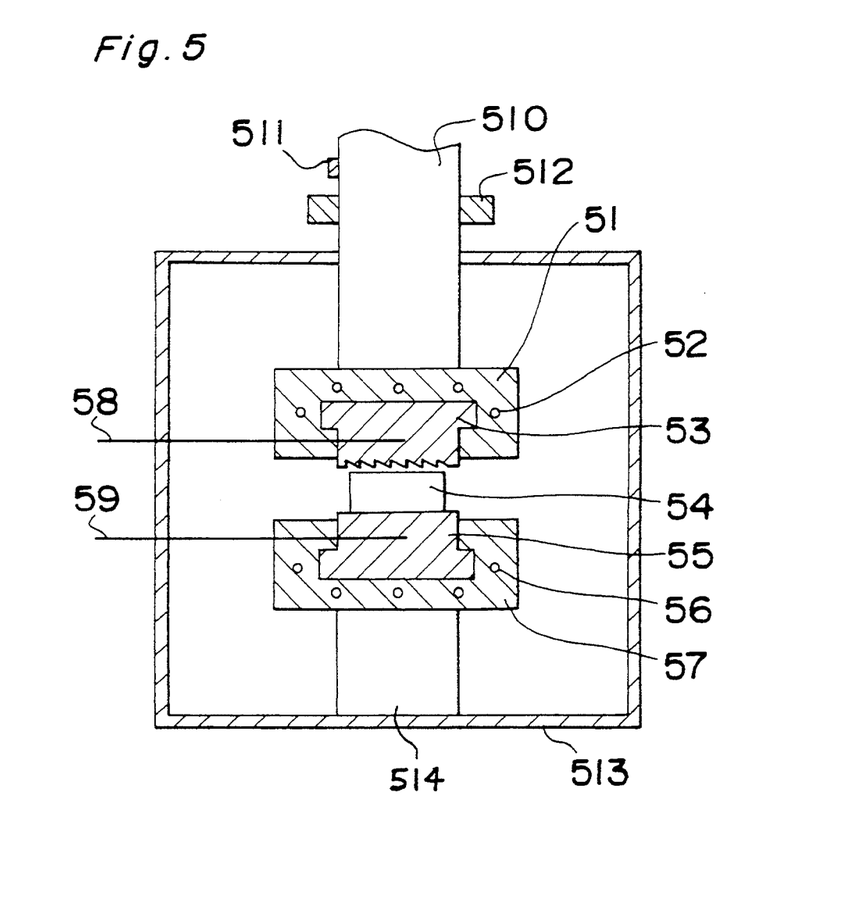
FIG. 5 is a schematic diagram of a press-molding machine used in an embodiment of the present invention.

Next, it is explained how a glass grating is manufactured with the die for press-molding. FIG. 5 schematically illustrates a press-molding machine used in the present embodiment. A top die 53 is fixed to a block 51, and the block 51 is fixed to a plunger 510. A heater 52 is provided in the block 51, and a thermo-couple 58 measures the temperature of the top die 53. On the other hand, a bottom die 55 is fixed to a block 57, and the block 57 is fixed to a base 514. A heater 56 is provided in the block 57, and a thermo-couple 59 measures the temperature of the bottom die 55. A glass plate 54 to be molded is put between the top and bottom dies 53, 55. By driving the plunger 510 downward, the glass plate 54 is molded. A position sensor 511 is provided to detect a stopper 512 fixed to the plunger 510. A cover 513 encloses the top and bottom dies 53, 55.

Figure 6:
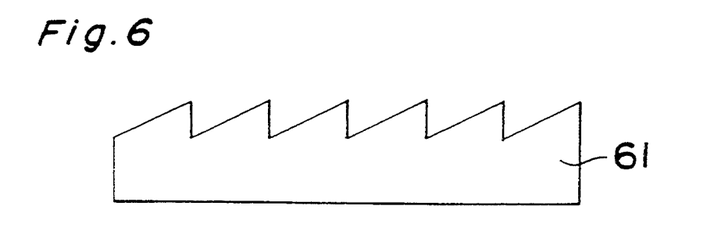
FIG. 6 is a schematic sectional view of a grating manufactured according to an embodiment of the present invention.

The die for press-molding shown in FIG. 4 is used as the top die 53, while a flat die is used as the bottom die 55. The flat die 55 is made from a cermet cylinder of 20 mm diameter and 6 mm thickness, having TiN as a main component. The top and bottom planes of the flat die 55 have flat surfaces, and the top plane is polished to have a specular plane and is coated by sputtering with a Pt-Ru-Ta alloy thin film of about 5 $\mu$m thickness as a protective layer on the cermet cylinder. A glass plate 54 of trade name SF-8 which has been formed to be a disc of 10 mm radius and 1 mm thickness is mounted on the bottom die 55, and the top die 53 is mounted above the glass plate 54. A nitrogen environment is realized inside the cover 513. Then, the temperature is increased to 500° C. by the heaters 52, 56, and a pressure of about 40 kg/cm$^2$ is applied by the plunger 510 to deform the glass plate 54 between the top and bottom dies 53, 55 to produce a glass grating 61 as shown schematically in FIG. 6. Then, the temperature is decreased to 400° C. and the resultant glass grating 61 is removed from the press-molding machine.

The performance of the die was examined as explained below. After repeating the above-mentioned press-molding 10,000 times, the top and bottom dies 53 and 55 were removed from the machine. Then, the die accuracy was evaluated by observing the state of the surface in contact with the glass plate 54 with an optical microscope while measuring the surface roughness (rms value, Å) at the same time. Because a prior art die is not available to form an accurate grating, two dies were prepared for comparison experiments; a flat die made of a prior art SiC sintered material, and a flat die of hard metal base body having WC as a main component coated with a Pt-Ir alloy film. These die were used repeatedly for press-molding 10,000 times in the press-molding machine, and the die accuracy was evaluated thereafter. The results of the press-molding test are shown in Table 1.

TABLE 1

| Sample No. | Die | Surface roughness (rms, Å) | Surface state after press-molding of 1000 times | |
|---|---|---|---|---|
| | | | Surface roughness | Surface state |
| 1 | This invention | Top Die 9.0 | 9.0 | good |
| | | Bottom Die 9.2 | 9.5 | good |
| 2 | SiC sintered die | Top Die 12.2 | cannot be measured | Glass adhered |
| | | Bottom Die 11.8 | cannot be measured | Glass adhered |
| 3 | Die of WC coated with Pt—Ti | Top Die 9.11 | 9.3 | Good |
| | | Bottom Die 9.8 | 9.1 | Good |

The die (Sample No. 2) with a flat surface made of SiC sintered material could not be further used for press-molding after several press-molding operations because glass adheres to the surfaces of both the top and bottom dies thereof.

As to the die (Sample No. 3) with a flat surface made of WC base body coated with Pt-Ir alloy film, the surface roughness was 9.3Å for the top die and 9.1Å for the bottom die after 10,000 press-molding operations. That is, the surface roughness for the top and bottom dies was nearly the same as before press-molding, and this shows that dies having a flat surface can be used for mass production. Further, the surface state of the dies does not change at all if compared to that before press-molding. Unfortunately, a die for grating having the same structure as the No. 3 sample cannot be produced because of difficulty in forming.

As to the die (Sample No. 1) of the present invention, the surface state did not change at all after repetitive press-molding, and the surface roughness does not change at all after 10,000 press-molding operations. Therefore, the die of the present invention has a die life of about the same order as the No. 3 die though the die of the present invention has a surface of fine shape in contrast to the flat surface of the No. 3 die. That is, mass production of accurate glass gratings becomes possible by using the grating die for press-molding.

As explained above, a die for press-molding a glass grating can be produced easily, and a die produced by this method has very good durability and has a long life. Thus, glass gratings can be press-molded repeatedly.

Further, by measuring the shape of 10,000 glass gratings produced by press-molding, it is observed that the gratings have the same shape as the grating master. Still further, after glass gratings manufactured as explained above are put for 300 hours in an environment of 60° C. temperature and 95% humidity, the shape thereof is measured, but no change of the shape is observed. Thus, the gratings are found very reliable.

A micro-optical element produced with the die has a very accurate shape. Because it is made of glass, the durability of the element is very superior, and the change due to temperature and humidity is extremely small if compared with that of a thermo-plastic resin element.

Though a cermet consisting of TiN as a main component is used for the base body 31 of the die for press-molding, similar results can be obtained by using a hard metal consisting of WC as a main component, a cermet consisting of TiC as a main component or a WC sintered material for the base body 31.

The composite layer 32 is made of heat-resistant materials. It may be made of a heat-resistant metal, a heat-resistant metal oxide, a heat-resistant metal nitride or heat-resistant metal carbide.

Further, though a Pt-Ru-Ta alloy thin film is used as the protective layer 43, needless to say, other platinum group alloy films which are durable and have little reactivity with glass may also be used to obtain similar results.

Still further, though the Ni-P alloy electroplating process is used to form the thin film 22 having a transferred shape of the grating master shown in FIG. 1, any method for duplicating the inverse shape of the grating master can be used.

Further, mass production of other glass micro-optical elements having fine shapes has also not been previously realized. However, a die for press-molding of such an optical element can also be manufactured in a manner similar to the die for press-molding the grating.

Figure 7:
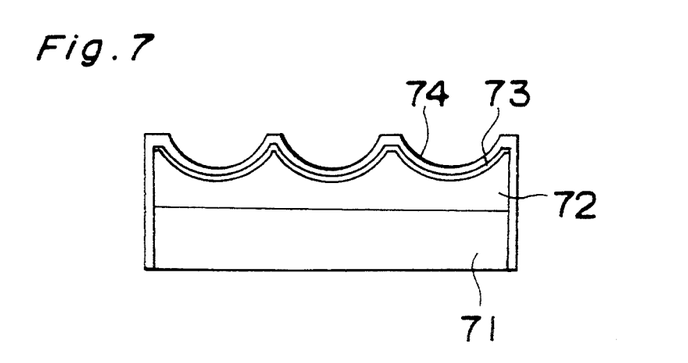
FIG. 7 is a schematic sectional view of a die for press-molding a micro-lens array, according to an embodiment of the present invention.
Figure 8:
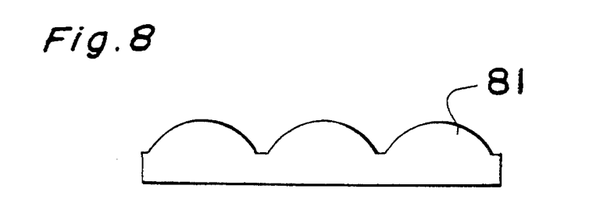
FIG. 8 is a schematic sectional view of a micro-lens array manufactured according to an embodiment of the present invention.

FIG. 7 shows a die for press-molding a micro-lens array such as shown in FIG. 8. The micro-lens array consists of an array of micro-lenses each of 200 μm diameter which can be used for converging light to each pixel in a charge-coupled device, a liquid crystal panel or the like to use light efficiently.

A master of the micro-lens array is produced first. After a releasing agent is coated on the surface of the master, a nickel (Ni) film 73 of about 0.1 μm thickness is deposited on the surface of the master, and a thin film 72 of nickel-phosphor (Ni-P) alloy of 50 μm thickness is applied to the nickel film 73 with an electroplating process. Then, the two-layer thin film 72, 73 thus produced is separated from the master, and the shape of the master is transferred inversely to the thin film 73. The rear plane of the film 72 is ground to form a flat plane. On the other hand, a cermet cylinder 71 having TiN as a main component and having a 20 mm diameter and a 6 mm thickness is polished to have top and bottom planes, and the top plane is polished to have a specular plane. Then, the thin film 72 is adhered with an adhering agent to the specular plane of the cermet cylinder. Further, a thin film 74 of platinum-ruthenium-tantalum (Pt-Ru-Ta) alloy of about 5 μm thickness is applied to the surface of the film 73 by sputtering to act as a protective layer. Then, the die shown in FIG. 7 is completed. By using this die as the top die 53 in the press-molding machine shown in FIG. 5, the micro-lens array shown in FIG. 8 can be produced accurately.

Figure 9:
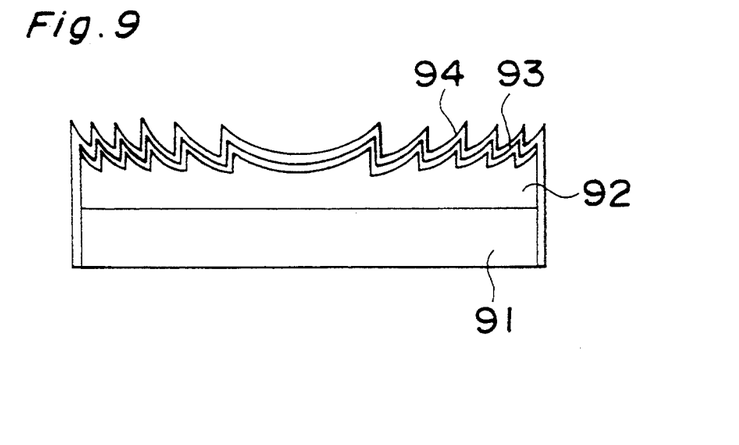
FIG. 9 is a schematic sectional view of a die for press-molding a micro-combined optical element, according to an embodiment of the present invention.
Figure 10:
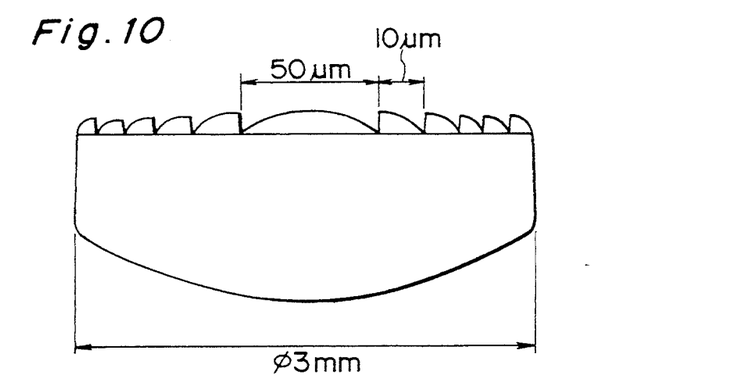
FIG. 10 is a schematic sectional view of a combined optical element manufactured according to an embodiment of the present invention.

FIG. 9 is a schematic sectional view of a die for press-molding a composite micro-optical element such as shown schematically in FIG. 10. The composite micro-optical element in this embodiment is a micro-grating lens integrated with a single convex lens of 3mm diameter, and it can reduce aberration.

A master of the composite micro-optical element is produced first. After a releasing agent is coated on the surface of the master, a nickel (Ni) film 93 of about 0.1 μm thickness is deposited on the surface of the master, and a thin film 92 of nickel-phosphor (Ni-P) alloy of 50 μm thickness is applied to the nickel film 93 by an electroplating process. The two-layer thin film 92, 93 thus produced is separated from the master, and the shape of the master is transferred inversely to the thin film 93. The rear plane of the film 92 is ground to form a flat plane. On the other hand, a cermet cylinder 91 having TiN as a main component and having a 20 mm diameter and a 6 mm thickness is polished to have top and bottom planes, and the top plane is polished to have a specular plane. Then, the thin film 92 is adhered with an adhering agent to the specular plane of the cermet cylinder. Further, a thin film 94 of platinum-ruthenium-tantalum (Pt-Ru-Ta) alloy of about 5 μm thickness is applied to the surface of the film 93 by sputtering to act as a protective layer. Then, the die shown in FIG. 9 is completed and is used as the top die 53. A die having a prescribed shape in correspondence with the shape of the convex lens is produced as the bottom die 55. By using the top and bottom dies 53, 55 in the press-molding machine shown in FIG. 5, composite optical elements such as shown in FIG. 10 can be produced accurately.

Figure 11:
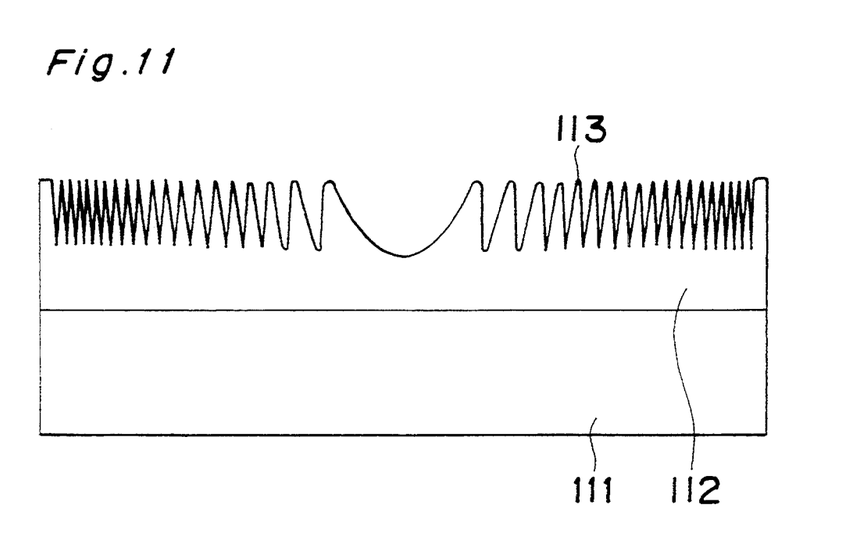
FIG. 11 is a schematic sectional view of a die for press-molding a micro-Fresnel lens, according to an embodiment of the present invention.
Figure 12:
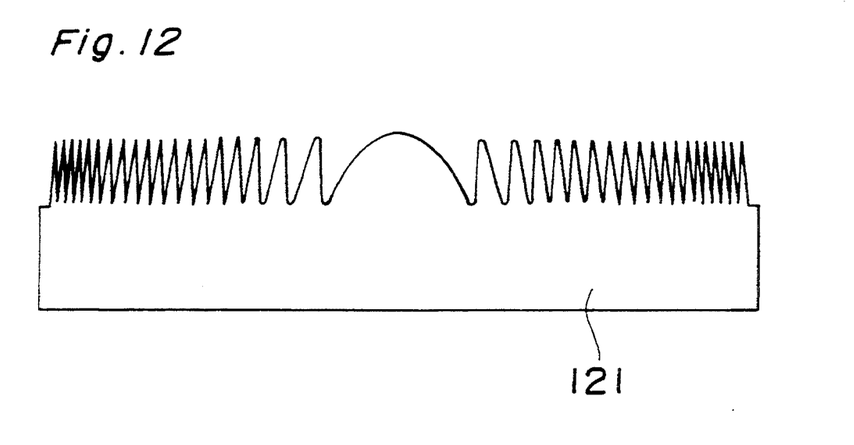
FIG. 12 is a schematic sectional view of a micro-Fresnel lens of an embodiment of the present invention.

FIG. 11 shows a die for press-molding a micro-Fresnel lens such as shown in FIG. 12. The micro-Fresnel lens of 1.2 mm diameter is a diffraction type lens of a very thin thickness of 1 μm and it can be used for a photodetector, a beam splitter or the like.

A master of the micro-Fresnel lens is produced first. After a releasing agent is coated on the surface of the master, a nickel (Ni) film 113 of about 0.1 μm thickness is deposited on the surface of the master, and a thin film 112 of nickel-phosphor (Ni-P) alloy of 50 μm thickness is applied to the nickel film 113 by an electroplating process. The two-layer thin films 112, 113 thus produced is released from the master, and the shape of the master is transferred inversely to the thin film 113. On the other hand, a cermet cylinder 111 having TiN as a main component and having a 20 mm diameter and a 6 mm thickness is polished to have top and bottom planes, and the top plane is polished to have a specular plane. Then, the thin film 112 is adhered with an adhering agent to the specular plane of the cermet cylinder. Further, a thin film (not shown for brevity of drawing) of platinum-ruthenium-tantalum (Pt-Ru-Ta) alloy of about 5 μm thickness is applied to the surface of the film 113 by sputtering to act as a protective layer. Then, the die shown in FIG. 11 is completed. By using the die as the top die 53 in the press-molding machine shown in FIG. 5, the micro-Fresnel lenses shown in FIG. 12 can be produced accurately.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a die used in forming a micro-optical element, said method comprising the steps of:
    providing a master of the micro-optical element to be manufactured;
    forming a first layer on the surface of said master, said first layer comprising a heat-resistant material and having first and second surfaces, said first surface of said first layer having a shape inverse to a shape of said master;
    separating said first layer from said master;
    flattening said second surface of said first layer;
    providing a base body having a first planar surface;
    adhering said second surface of said first layer to said first planar surface of said base body; and
    coating a second layer on said first surface of said first layer, said second layer comprising a material which does not adhere to glass and is heat-resistant at high temperatures.

2. The method according to claim 1, wherein said base body comprises:
    a hard metal including tungsten carbide (WC) as a main component;
    a cermet including titanium carbide (TIC) or titanium nitride (TIN) as a main component; or
    a WC sintered material.

3. The manufacturing method according to claim 1, wherein
    said first layer comprises a heat-resistant metal, a heat-resistant metal oxide, a heat-resistant metal nitride or a heat-resistant metal carbide.

4. The manufacturing method according to claim 1, wherein
    said first layer is formed with a wet deposition process of electroplating or electroless plating or with a dry process of vacuum deposition, sputtering or ion plating.

5. The manufacturing method according to claim 1, wherein
    said second layer is made of a platinum group alloy including at least one among platinum (Pt), rhodium (Rh), iridium (Ir), ruthenium (Ru) and osmium (Os).

6. The method according to claim 1, wherein
    said master of the micro-optical element to be manufactured comprises a master of a grating.

7. The method according to claim 1, wherein
    said master of the micro-optical element to be manufactured comprises a master of a micro-Fresnel lens.

8. The method according to claim 1, wherein
    said master of the micro-optical element to be manufactured comprises a master of a micro-lens array.

9. A method of manufacturing a micro-optical element, comprising the steps of:
    providing a first die manufactured in the steps of: providing a master of the micro-optical element to be manufactured; forming a first layer on the surface of said master, said first layer comprising a heat-resistant material and having first and second surfaces, said first surface of said first layer having a shape inverse to a shape of said master; separating said first layer from said master; flattening said second surface of said first layer; providing a first base body having a first planar surface; adhering said second surface of said first layer to said first planar surface of said first base body; and coating a second layer on said first surface of said first layer, said second layer comprising a material which does not adhere to glass and is heat-resistant at high temperatures;
    providing a second die produced in the steps of grinding a surface of a second base body, and coating a third layer on said surface of said second base body, said third layer comprising a heat-resistant material;
    mounting a glass plate between said first and second dies;
    heating said glass plate above a softening temperature thereof;
    press-molding said glass plate between said first and second dies; and cooling said glass plate and removing said glass plate from between said first and second dies.

10. The method according to claim 9, wherein said first and second base bodies are formed of a hard metal.

11. A micro-optical element manufactured by the steps of:
providing a first die manufactured in the steps of: providing a master of the micro-optical element; forming a first layer on the surface of said master, said first layer comprising a heat-resistant material and having first and second surfaces, said first surface of said first layer having a shape inverse to a shape of said master; separating said first layer from said master; flattening said second surface of said first layer; providing a first base body having a first planar surface; adhering said second surface of said first layer to said first planar surface of said first base body; and coating a second layer on said first surface of said first layer, said second layer comprising a material which does not adhere to glass and is heat-resistant at high temperatures;
providing a second die produced in the steps of grinding a surface of a second base body, and coating a third layer on said surface of said second base body, said third layer comprising a heat-resistant material;
mounting a glass plate between said first and second dies;
heating said glass plate above a softening temperature thereof;
press-molding said glass plate between said first and second dies; and
cooling said glass plate and removing said glass plate from between said first and second dies.

12. The micro-optical element according to claim 11, wherein said master of the micro-optical element comprises a master of a grating.

13. The micro-optical element according to claim 11, wherein said master of the micro-optical element comprises a master of a micro-Fresnel lens.

14. The micro-optical element according to claim 11, wherein said master of the micro-optical element comprises a master of a micro-lens array.

15. The method according to claim 11, wherein said first and second base bodies are formed of a hard metal.

* * * * *